June 7, 1938. R. HOLZCKER 2,119,915
BONDING PROCESS FOR CITRUS FRUIT SKIN COLORING
Filed Jan. 24, 1936
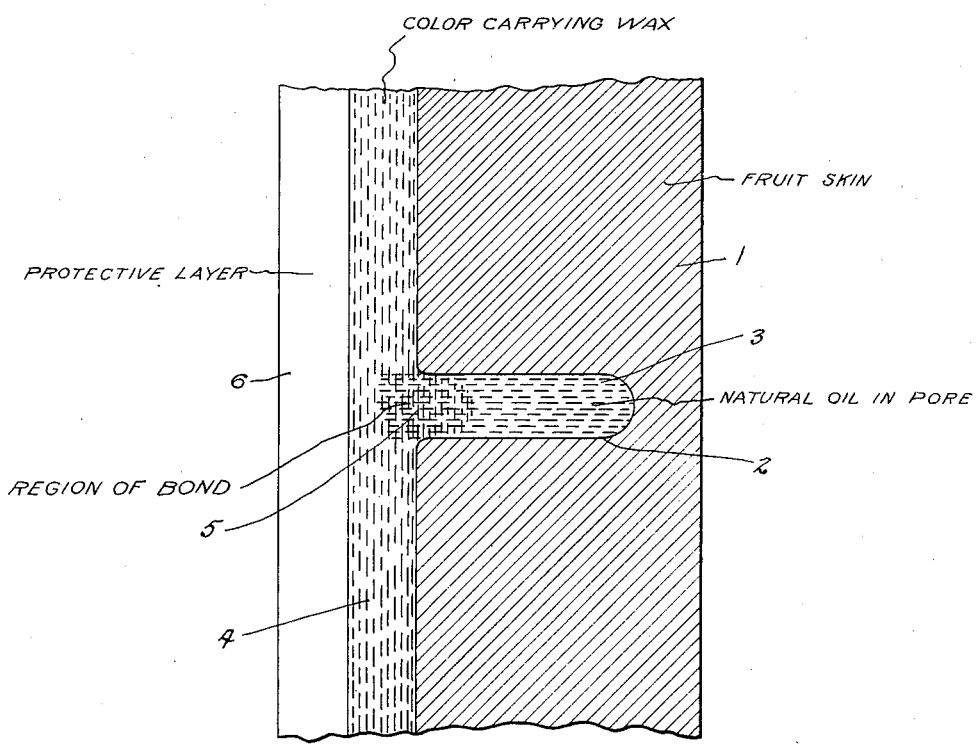
Inventor
*Richard Holzcker*

Patented June 7, 1938

2,119,915

UNITED STATES PATENT OFFICE 2,119,915

BONDING PROCESS FOR CITRUS FRUIT SKIN COLORING

Richard Holzcker, Lake Wales, Fla., assignor of one-third to C. C. Commander, Tampa, Fla., and one-third to I. A. Yarnell, Lake Wales, Fla.

Application January 24, 1936, Serial No. 60,680

4 Claims. (Cl. 99—103)

This invention relates to a process of treating the surfaces of citrus fruit with a view to improving the color of the skin or rind and at the same time retarding the shrinkage tendency of the fruit.

Although it is old in the art to enhance the color of the fruit skins by the use of a suitable dye or other coloring agent, such methods have been founded upon the necessity of breaking down the native resistance to color absorption, of the fruit, and replacing certain of the essential oils of the skin by the color imparting substance, which together with its vehicle becomes a direct impregnant of the skin.

In order to accomplish this interchange of coloring matter for the natural oils, waxes, etc., which normally fill the pores of citrus fruit, the known processes contemplate the subjection of the fruit to the action of a solvent common both to the coloring agent and the oils of the skin, for so long a time and at such a high temperature as to materially alter certain characteristics of the fruit skin. For instance, the natural oils and waxes become diffused and diluted in the body of treating liquid, and the skin becomes a porous body having the pores filled with extraneous matter—the coloring agent and its vehicle—but from which the oils which give aroma and tang to the fruit have been materially depleted. Furthermore, the high temperature at which the process must be practiced wilts the cellular structure of the skin and impairs the keeping quality of the fruit.

The present invention has for its object to provide a coloring process which does not extract the native oils or waxes from the depths of the skin, but on the contrary leaves them intact in situ in the pores and applies the coloring agent in a suitable vehicle by bonding the said vehicle to the oil or wax in the pores of the skin. This it does by merely softening the surface of the oil or wax bodies in the pores of the skin by means of a solvent for the native oil or wax, which solvent carries both the color and the vehicle for the color, the latter being usually a wax and applied to the surface of the fruit at a relatively low temperature (room temprature) for a brief time only and with the solvent properly buffered if necessary, that is to say, having its co-efficient of dissolubility reduced or controlled to prevent its acting deep on the oil or wax bodies in the pores during the short period of its application.

In the working of the process, there is an interdigitation of color carrying wax particles with the superficial portion of the oil or wax bodies in the pores and a slight diffusion of the surface portions of the native oil or waxes in the color carrying wax film, in the region of the mouths of the pores, but the main body of oil or wax in the pores remains intact.

In the accompanying drawing the sole figure represents diagrammatically the conditions and results of the process, the numeral 1 representing the citrus fruit skin, 2 being a pore filled with a body of natural oil or wax 3. The film of color carrying wax is shown at 4 and at 5 is a region at the mouth of a pore in which there is some infiltration of the color carrying wax into the adjacent portion of the oil or wax body 3 and a corresponding diffusion of some of the oil or wax near the mouth of the pore into the color carrying wax film 4. A protective uncolored wax film 6 is shown exterior to the color carrying wax film.

Since, depending upon soil and climatic conditions, a large proportion of any citrus fruit crop matures chemically without corresponding maturity in color, it becomes essential in the interest of the salability of such fruit that the color thereof be made uniform or enhanced so as to bring it to the true varietal color of the fruit. It is also highly desirable that shrinkage of the fruit should be retarded by sealing the surface pores of the fruit skin. Both of these ends are accomplished by the present process and without impairing either the flavor or keeping qualities of the fruit. As has been stated in connection with the objects of the present invention, the coloring of citrus fruit as now practiced has two distinct disadvantages, one that the aromatic oils and flavoring principles of the skin are extracted and the other that the high temperature which is in the neighborhood of 110 degrees F., at which known processes must be operated has a wilting effect upon the fruit skin and impairs its keeping qualities.

The broad concept of the present invention is to apply a suitably colored wax to the surface of the fruit and to bond this wax to the fruit skin merely by creating a slight interlocking between the contacting surfaces of the bodies of oil and wax which normally fill the pores with the colored wax film which envelops the fruit skin. This can only be done in the presence and by the action of a solvent in which both the color carrying wax and the native oils of the fruit skin are soluble, but in order to insure that the solvent shall not penetrate deep into the pores so as to displace the natural oils and waxes, three elements of control must be provided; first, the activity of the solvent must be controlled if necessary; secondly, the temperature at which the reaction takes place must be kept low and finally, the time period of application must be short.

The process is carried out by providing a quantity of the treating liquid which may consist of any suitable wax such as paraffine, carnauba, etc., and a suitable coloring agent such as Yellow AB, Yellow OB, alkanet red, or other vegetable extract and dissolving both the wax and the coloring agent in a suitable solvent which is known to have the property of dissolving the native oils and waxes of the citrus fruit skins. Examples of such solvents are materials of the glycol ether group, such as diethylene glycol monoethyl ether, ethylene glycol monoethyl ether, etc, also such substances as diethylene oxyde, diethylene glycol, etc. This solution, in the form of a solution or emulsified, with water or other emulsifier is applied to the fruit in any suitable manner as by dipping, spraying, wiping or brushing. Under optimum conditions, the temperature should not exceed 90° F. nor should the period of treatment be substantially longer than a minute or so. The lower the temperature, the more latitude may be permitted as regards the period of application.

Since certain otherwise suitable solvents are normally of such activity as to be difficult of control, it is only by a proper buffering and balancing that such solvents can be used without excessive dissolving of the native bodies of wax and oil in the pores of the fruit skin.

In practice, the fruit is exposed to the action of the color-solvent-wax solution or emulsion, for approximately one minute at room temperature, (not exceeding 90° F.) then immediately washed off by spraying with water so as to stop all action by excess material adhering to the fruit. The fruit is then preferably dipped into a wax emulsion or solution without color, to protect the dye-wax film.

The fruit is then subjected to subsequent operations of drying and polishing and during the time required for such steps the two wax films blend, giving a film of shrinkage-retarding and color-bearing quality far superior to any that have been accomplished with other means.

As a specific example, the process may be accomplished by preparing a batch consisting of from 5 to 30 parts of wax, paraffine or carnauba, 1 to 15 parts of dye according to the nature of the dye and the desired intensity of color dissolved in from 10 to 40 parts of a solvent. The temperature of this batch is not permitted to rise above 90° F. The surface of the fruit is brought into contact with liquid from this batch in any one of the manners above suggested and held in relation thereto for one minute. It is then withdrawn from the application of said liquid and immediately subjected to a water spray by means of which all excess liquid is removed from the surface of the fruit and the activity thereof stopped. The fruit then undergoes the usual steps of drying and polishing. If it is desired to treat the fruit with an emulsion instead of a solution, the above batch is mixed with 100 parts of water before being brought into contact with the surfaces of the fruit.

If the nature of the solvent is such as to indicate the desirability of dampening or buffering its activity as, for example, when alcohol is employed as a solvent, it should be buffered with an equal portion of glycerine prior to being applied to the fruit skins. In like manner ethylene glycol monoethyl ether should be buffered with approximately thirty percent glycol.

While I have in the above description disclosed what I believe to be a preferred and practical embodiment of the invention, it will be understood by those skilled in the art that the invention is entitled to a range of equivalents as to the substances or agents employed and to such variations in technique as may from time to time be developed in the exercise of the invention.

What I claim is:

1. Process of enhancing the natural color of the skin or peel of fresh citrus fruits and at the same time providing a shrinkage-preventing film on said skin or peel, comprising exposing the fruit to the action of a color-solvent-wax solution, the solvent being a liquid having penetrant properties for the oily or waxy constituents in the pores of the fruit peels, for approximately one minute and at a temperature not exceeding 90° F., then immediately removing excess color-solvent-wax solution whereby penetration is stopped at the mouths of the pores, the wax film being bonded only at the mouths of the pores and the natural oily and waxy constituents being conserved in the depths of the pores.

2. Process as claimed in claim 1, including the step of buffering the action of a quick-acting solvent by the addition to the solution of an ingredient for retarding the penetrant action of the solvent.

3. Process as claimed in claim 1, including the subsequent step of superposing a non-colored wax film upon the bonded film.

4. Process of enhancing the natural color of, and imparting a shrinkage-inhibiting film to the skin or film of fresh citrus fruits without materially removing the oily constituents of the fruit skins, as claimed in claim 1, the color-solvent-wax being applied in the form of an aqueous emulsion.

RICHARD HOLZCKER.